United States Patent [19]

Medeiros

[11] 3,721,450

[45] March 20, 1973

[54] MULTIPLE CASSETTE TAPE DUPLICATOR WITH SINGLE TAPE TRANSPORT

[75] Inventor: Joseph C. Medeiros, Chicago, Ill.

[73] Assignee: Gardberg-Medeiros Co., d/b/a Magnetics Research Co., Chicago, Ill.

[22] Filed: April 10, 1970

[21] Appl. No.: 27,227

[52] U.S. Cl. ................................274/3, 179/100.2 E

[51] Int. Cl. ................................................G11b 5/86

[58] Field of Search ..................274/3; 242/180, 181; 179/100.2 E, 100.2 MD

[56] References Cited

UNITED STATES PATENTS

| | | | |
|---|---|---|---|
| 3,495,835 | 2/1970 | Lao | 274/4 E |
| 2,560,234 | 7/1951 | Masterson | 179/100.2 E |
| 3,534,178 | 10/1970 | Weigel et al. | 274/4 F |
| 1,811,817 | 6/1931 | Stille | 274/3 |
| 2,686,057 | 8/1954 | Woolf | 274/3 |

*Primary Examiner*—Leonard Forman
*Assistant Examiner*—Steven L. Stephan
*Attorney*—Johnston, Root, O'Keeffe, Keil, Thompson & Shurtleff

[57] ABSTRACT

A cassette tape duplicator wherein a plurality of tape cassettes for duplication and a master cassette are loaded in the form of a single deck into a slidable drawer wherein the cassettes are positioned for engagement with a single tape transport when the drawer is closed for recording and in which synchronization of speed and torque between master cassette and duplicates is maintained by a common capstan shaft. Any variations of speed affect both master and duplicates so that the recordings follow faithfully the magnetic impressions of the master. The need for sophisticated synchronization techniques to abate distortion between tapes are thus effectively reduced resulting in a less expensive device.

6 Claims, 17 Drawing Figures

INVENTOR.
JOSEPH C. MEDEIROS
BY
Johnston Root O'Keeffe Keil
Thompson & Shurtleff
Attys INVENTOR.
JOSEPH C. MEDEIROS
BY
Johnston Root O'Keeffe Keil Thompson & Shurtleff
attys INVENTOR.
JOSEPH C. MEDEIROS
BY
Johnston Root O'Keeffe Keil Thompson & Shurtleff
attys INVENTOR.
JOSEPH C. MEDEIROS
BY
Johnston Root O'Keeffe Keil Thompson & Shurtleff INVENTOR.
JOSEPH C. MEDEIROS
BY
Johnston Root O'Keeffe Keil
Thompson & Shurtleff
Attys

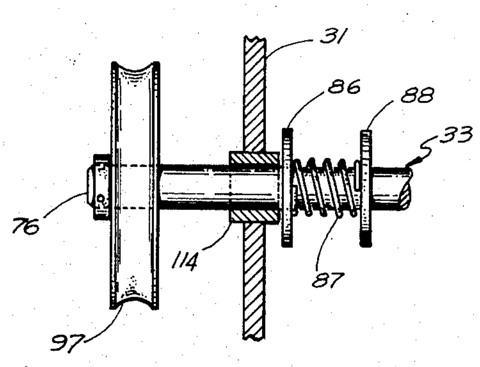
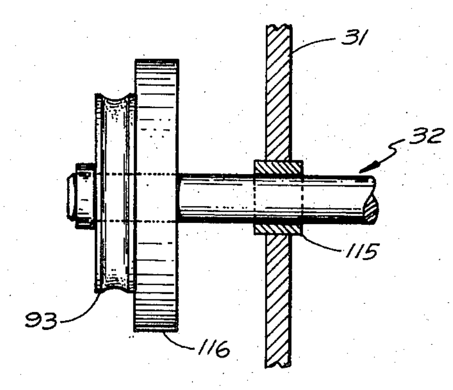
FIG. 15 FIG. 16
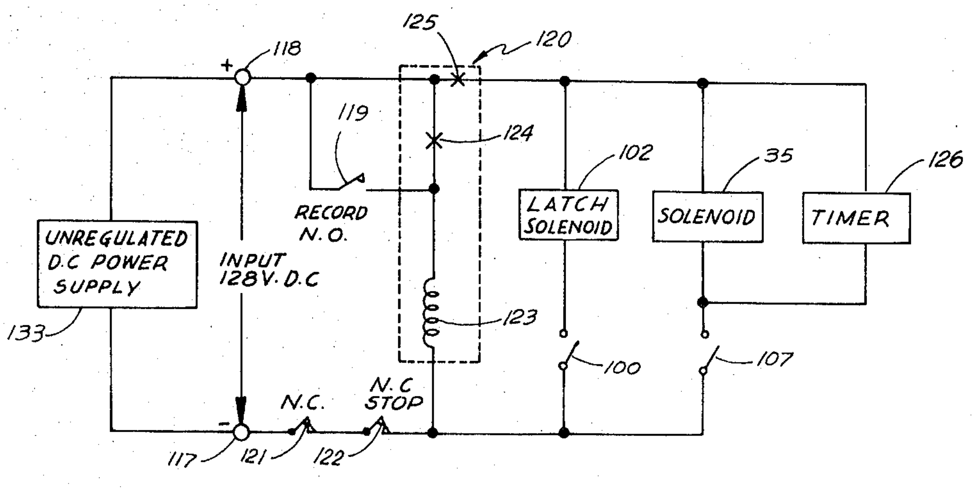
FIG. 17
INVENTOR.
JOSEPH C. MEDEIROS
BY
Johnston Root O'Keeffe Keil Thompson & Shurtleff
Attys

MULTIPLE CASSETTE TAPE DUPLICATOR WITH SINGLE TAPE TRANSPORT

BACKGROUND OF THE INVENTION

Numerous copies of magnetic tapes containing instructional materials are often required by schools or business firms. The use of tape cassettes is rapidly taking a complete hold of the field. It is frequently important that such duplicates be produced rapidly, with a minimum loss of quality. A reasonably priced but accurate duplicating device which can be operated without difficulty by businessmen or school personnel would find a ready market.

A number of devices are available for duplicating previously recorded cassettes. The master cassette tape and the slaves, however, are driven by individual motors. This requires the use of elaborate servo-controlled constant tape tension and speed control means to eliminate frequency variations between the master and duplicate tapes. If such is not provided there is a loss of frequency fidelity between the master and the duplicates.

It is an object of this invention to eliminate the need for elaborate servomechanisms to lessen frequency distortion or wow between the master tape and duplicates.

It is another object of this invention to provide a more simple device for high speed duplication of cassettes.

It is still another object of this invention to provide a duplicating machine in which cassettes can be loaded for recording in a rapid manner.

Other objects will become apparent to those skilled in the art from the following description of the invention.

BRIEF DESCRIPTION OF THE INVENTION

The present invention relates to a device for high speed production of a plurality of conventional magnetic tape cassettes from a single prerecorded tape cassette in which the cassettes are driven by a common tape transport shaft.

The subject cassette tape duplicator includes a cassette mounting assembly which preferably is a slidably arranged drawer having tandem slots or other positioning means by which a plurality of cassettes are held in place. One of the cassettes is a prerecorded master having a specifically identified slot into which it is placed. The balance of the cassettes are for duplication. When the cassettes are positioned in the drawer, the drawer is closed in preparation for the duplication process. The cassettes are stacked in a single deck. Therefore, the closing of the drawer moves the cassettes uniformly along at least two (preferably three) separate shafts. The first such shaft is the continuously rotating take-up shaft. This shaft includes alternately arranged splined driving collars which engage the splined centers of the cassette take-up reels. The construction of a preferred take-up shaft will be described more fully below.

The second shaft is the capstan or tape driver. At the time the drawer is fully closed, a solenoid is activated which causes a moving block assembly containing pinch rollers, recording heads and playback head to move into proximity with the cassette tapes. The magnetic tapes are engaged between the respective pinch rollers and the common capstan shaft. The capstan shaft, driven by a single, conventional motor, drives the magnetic tapes past the recording heads and playback head from the pay-off reels to the take-up reels.

A third shaft is preferably positioned for passage through the center of the pay-off reels. This shaft stabilizes the reels as they are rotating while paying off the magnetic tape.

Because of the deck arrangement of the cassettes, each magnetic tape is driven by the common capstan shaft which means that with respect to each other, the master tape and the duplicate tapes will have no speed differential, thus eliminating frequency distortion.

When the drawer is closed for recording a locking means is activated. This can include a spring operated latch or preferably a solenoid which when activated causes a drawer interlock to engage an extension pin on the drawer and prevent its being opened during recording. In sequence, this solenoid is activated first to insure drawer security, then the solenoid which controls the moving block assembly is activated. This sequence assures proper positioning of the tape transport and recording heads with respect to the cassette magnetic tapes and thus a proper recording.

The recording process may be stopped at any time by depressing the stop switch on the master control panel. This action de-energizes both solenoids which causes the moving block assembly to move the recording heads, the playback head and the pinch rollers away from the magnetic tapes and cassette housings and releases the cassette mounting means (preferably a drawer) for withdrawal. This same result may be accomplished automatically at the end of tape duplication by an electronic timer. The timer is adjustable to coincide with the length of tapes in the cassettes and opens the control circuit at the lapsing of the preset time. An alternate to this electronic timer is any end of tape sensing device such as one employing the use of a photoelectric cell and a light source. When clear Mylar appears at the end of the magnetic tape, the light source activates the photoelectric cell which in turn causes a relay to open the control circuit with the results as described above.

DESCRIPTION OF THE DRAWING

The invention can be more fully understood by reference to the drawing in which:

FIG. 15 is a side sectional view of take-up shaft 33 shown in FIGS. 2, 3, 8, and 11;

FIG. 16 is a side view of the capstan shaft 32 shown in FIGS. 1, 2, 3, and 11; and FIG. 17 is an electrical circuit diagram showing the operation of the duplicator solenoids.

DETAILED DESCRIPTION

Figure 1:
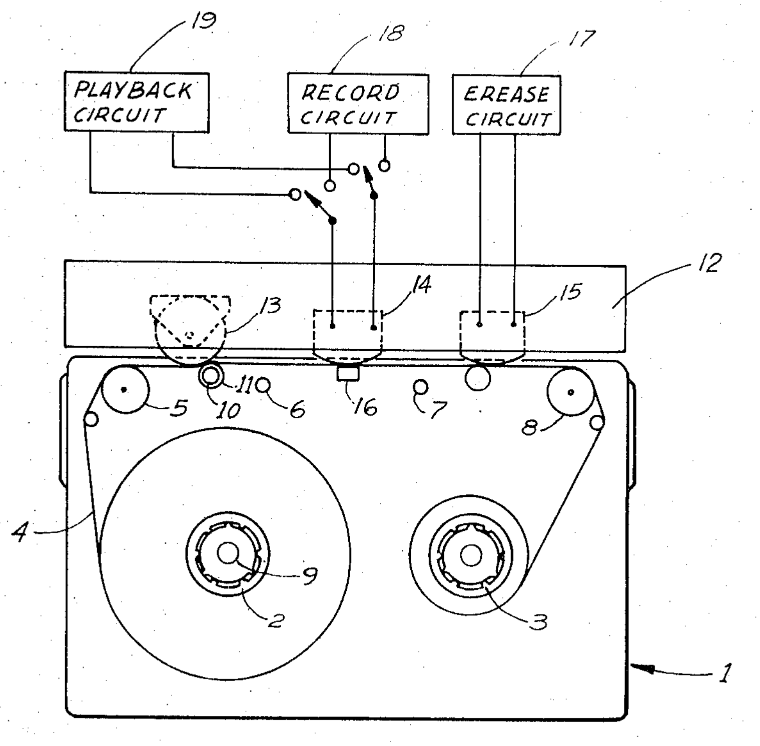
FIG. 1 is a diagrammatic illustration of a conventional cassette type tape recorder.

In FIG. 1, a conventional magnetic tape cassette 1 containing reels 2 and 3, is shown. Magnetic tape 4 is would on reels 2 and 3 and is threaded as shown around guide pins 5, 6, 7 and 8. The recording on the tape is generally two channel stereo or a total of four tracks, two tracks in each direction. Thus it is only necessary to turn the cassette 1 over to play the information recorded on the other two tracks, thereby eliminating rewind. Splined shaft 9 which engages the splined central opening of reel 2, is driven by a conventional electric motor (not shown). Capstan shaft 10, also driven by an electric motor (not shown) passes through hole 11 in cassette 1. During the record mode of operation, moving block 12, which provides a mounting for pinch roller 13, tape head 14 and erase head 15, is positioned in close proximity to cassette 1 such that pinch roller 13 engages tape 4 as the tape passes over capstan shaft 10 and tape head 14 engages tape 4 as tape 4 moves between head 14 and pressure pad 16. When moving block 12 is moved away from cassette 1, the cassette is clear for removal or insertion. In the recording process, tape 4 is drawn from reel 3 and passes under erase head 15. Erase head 15, which is driven by conventional erase circuit 17, generates an electrical field sufficient to erase any subject matter previously recorded on the tape. The erased tape then passes between pressure pad 16 and tape head 14. Tape head 14 is driven during the record mode of operation by conventional record circuit 18. Playback circuit 19 is disabled during the record mode of operation by switch 19S. Tape head 14, in response to signals from record circuit 18, generates an electrical field of a magnitude sufficient to record the desired subject matter on tape 4. Tape 4 then passes between pinch roller 13 and capstan shaft 10. The function of capstan shaft 10, which rotates at constant speed, and pinch roller 13 is to draw the tape 4 at a constant speed past tape head 14. Once past capstan shaft 10, tape 4 is wound on take-up reel 2 which is driven by another conventional motor (not shown) by means of a friction drive.

In the playback mode of operation, magnetic tape 4 passes under erase head 15, which is not energized, then between tape head 14 and pressure pad 16. Tape head 14 is connected to playback circuit 19 of known design and is utilized to sense the information recorded on tape 4 and to communicate the sensed information to the playback circuit 19. Record circuit 18 is disabled during the playback mode of operation.

The erase head 15 and tape head 14 are for the half tape in the direction shown. To record or playback the other half of the tape the cassette must be turned over. Tape 4 is looped on each end so that it is not run off the reels at the end of play or recording.

Figure 2:
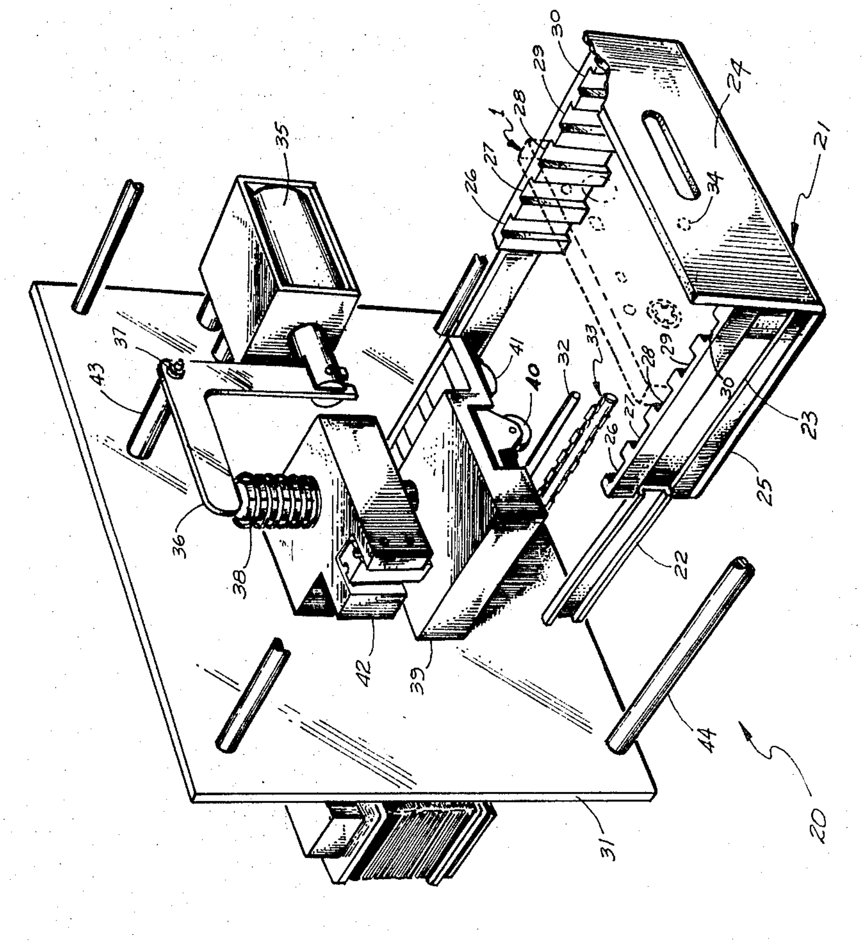
FIG. 2 is a front perspective view of the duplicator with the front plate removed.

Referring now to FIG. 2, drawer 21, which is shown slidably arranged on ball bearing slides 22, has sides 23, front plate 24 and bottom plate 25. Drawer 21 has slots 26, 27, 28, 29, and 30 situated as shown in sides 23. Slides 22 are securely attached to mounting plate 31. A cassette 1, of the type described in connection with FIG. 1, is shown positioned in slots 28. When drawer 21 is moved inwardly, the long capstan shaft 32 slides through capstan hole 11 in cassette 1. Similarly take-up shaft 33, which is rotating, slides through the splined central opening of reel 2 in cassette 1. Capstan shaft 32 is a small diameter centerless ground shaft which engages a ball bearing 34 located in drawer front plate 24 when the drawer 21 is fully closed.

In the embodiment of the invention shown in FIG. 2, the duplicator 20 is arranged to carry one master cassette and four cassettes to be duplicated from the master. The one and only correct slot position for the master cassette is indicated in an appropriate manner for the user (note description of FIG. 6). When the five cassettes have been loaded into drawer 21 and the drawer has been closed, solenoid 35 is energized. The electrical operation of solenoid 35 will be described in connection with FIG. 17. Solenoid 35, which is securely attached to mounting plate 31, is pivotally connected to the L-shaped bracket 36. Bracket 36 is pivotally arranged on pin 37. Pin 37 is situated in one end of standoff 43, the other end of standoff 43 being rigidly attached to mounting plate 31. When solenoid 35 is energized, bracket 36 engages spring loaded shaft 38, forcing shaft 38 to move in a downwardly direction. Shaft 38, which is slidably arranged in guide block 42, is connected to moving block assembly 39, which includes five pinch rollers 40 and five tape heads 41. Guide block 42 is rigidly attached to mounting plate 31. As shaft 38 moves downwardly, moving block assembly 39 is positioned in close proximity to the five cassettes loaded into drawer 21. Pinch rollers 40 engage tapes 4 as they pass over the continuously rotating capstan shaft 32, thereby causing tapes 4 to move across the tape heads 41 at constant speed which, for example, can be set for 15 inches per second. Tape heads 41 also engage tapes 4 immediately above the pressure pads 16 described in connection with FIG. 1. No erase heads are utilized in connection with the duplicator 20, since duplicator 20 is designed for bulk erasing, that is, the cassettes are erased prior to being put into the duplicator by a conventional bulk erase mechanism. Standoffs 44 are utilized to mount the front panel (not shown) of the duplicator 20.

Figure 3:
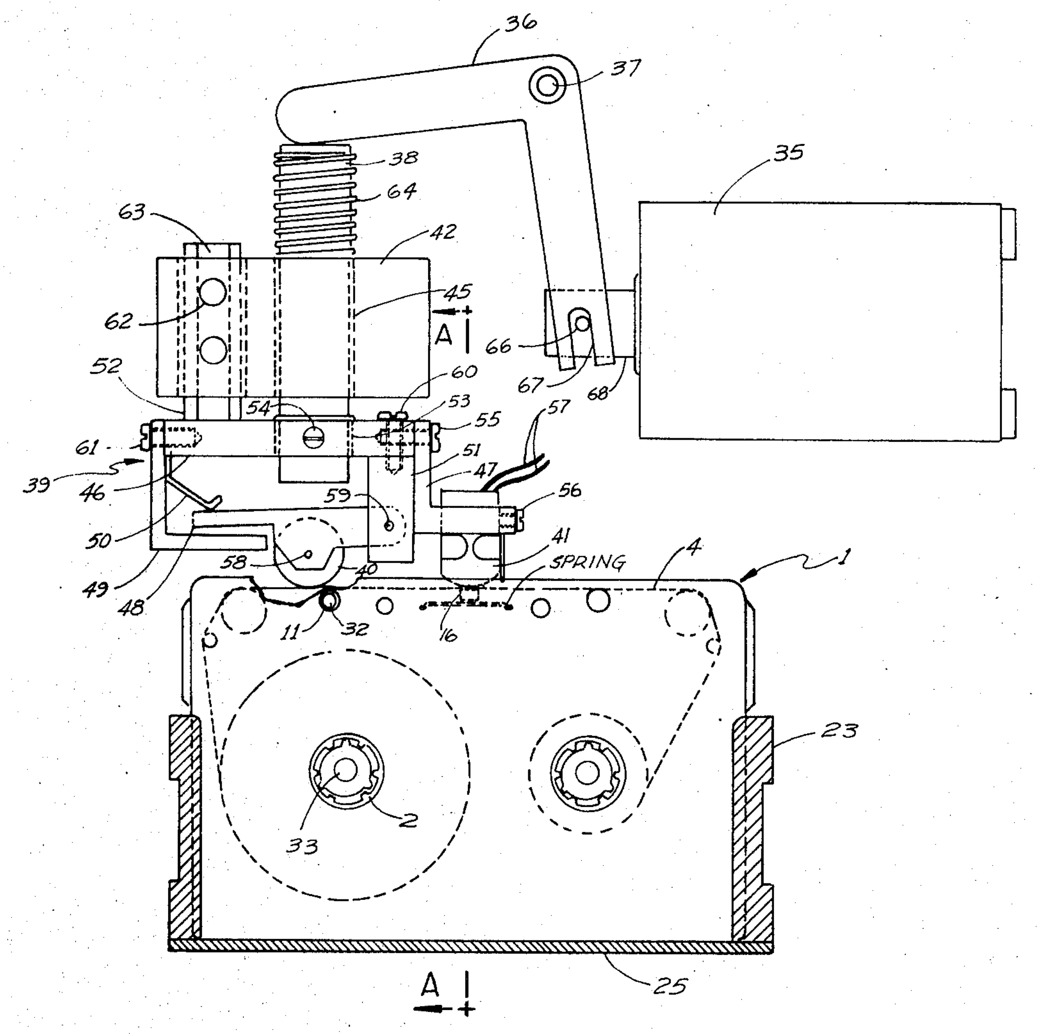
FIG. 3 is a front view of the duplicator with the front plate of the drawer removed, the drawer shown in its closed position.

In FIG. 3, solenoid 35 is energized, causing shaft 38 to be depressed by L-shaped bracket 36 which pivots on pin 37. Bracket 36 is pivotally connected to shaft 68 of solenoid 35 by means of pin 66 which is slidably arranged in slot 67 of bracket 36. Moving block assembly 39 is shown in its lowered position wherein pinch roller 40 and tape head 41 engage tape 4 in cassette 1. Shaft 38 passes through central bore 45 of guide block 42. Moving block assembly 39 includes plate 46, head mounting bracket 47, pinch roller mounting brackets 48, pinch roller travel limit bracket 49, springs 50, mounting blocks 51 and guide 52. Shaft 38 passes through bore 53 in plate 46 and is securely fastened to plate 46 by means of screw 54. Head mounting bracket 47 is fastened to plate 46 by means of screws 55. Heads 41 are positioned as shown in head mounting bracket 47 and held in place by means of screws 56. Input signals to and output signals from heads 41 are conveyed via leads 57 to playback and record circuits of conventional design. Pinch rollers 40 are rotatably mounted by means of pins 58 in pinch roller mounting brackets 48, which are pivotally arranged on pin 59. Pin 59 is securely mounted at each end in mounting blocks 51. Mounting blocks 51 are securely attached to plate 46 by means of screws 60. L-shaped pinch roller support bracket 49, which limits the downward excursion of pinch roller mounting brackets 48 when shaft 38 is in the up position is attached to plate 46 by means of screws 61. Springs 50, which provide a predetermined downward pressure on pinch roller mounting brackets 48, have right angle bends in their mounting ends which fit into small bores of plate 46 and are held in place by the secure mounting of pinch roller travel limit bracket 49. The lower end of guide 52 is rigidly attached, at right angles, to plate 46. Guide pins 62, which are arranged as shown in guide block 42, are positioned in channels 63 of guide 52. The function of guide 52 and guide pins 62 is to maintain a precise vertical orientation of guide 52, and correspondingly, a precise horizontal orientation of plate 46 as moving block assembly 39 moves up and down. When solenoid 35 is de-energized spring 64 causes moving block assembly 39 to return to its raised position.

Figure 4:
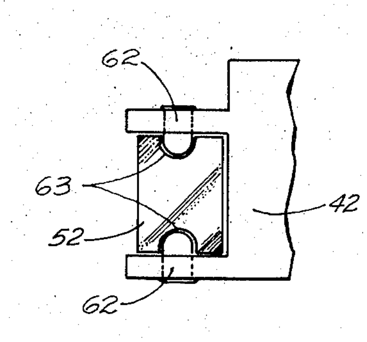
FIG. 4 is a top view of guide 52 shown in FIG. 3.

FIG. 4 is a top view of guide 52 showing the engagement of guide pins 62 in channels 63.

Figure 5:
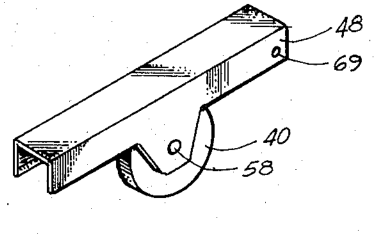
FIG. 5 is a perspective view of pinch roller mounting bracket 48 shown in FIG. 3.

FIG. 5 is a perspective view of pinch roller mounting bracket 48. Pinch roller 40 is shown mounted in bracket 48 by means of pin 58. Hole 69 is provided to permit the passage of pin 59 through bracket 48 as described in connection with FIG. 3.

Figures 6, 7, 9, 10:
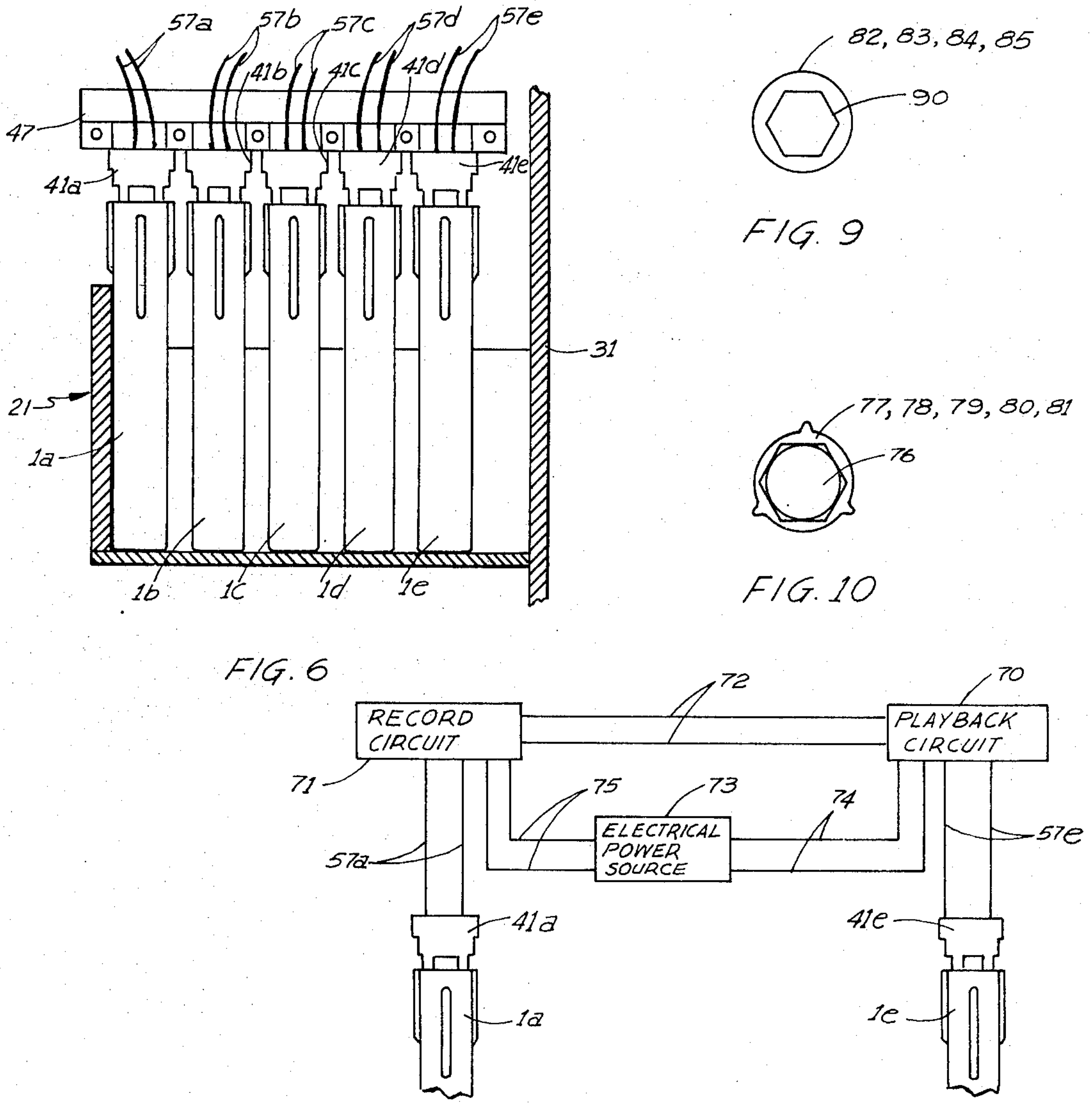
FIG. 6 is a side sectional view of the drawer taken along lines A—A of FIG. 3.
FIG. 7 is a diagrammatic illustration of the duplication process.
FIG. 9 is an end view of the drive collars of FIG. 8.
FIG. 10 is an end view of the splined cassette drivers of FIG. 8.

FIG. 6 is a side sectional view of drawer 21 taken along lines A—A of FIG. 3. Cassettes 1*a*, 1*b*, 1*c*, 1*d*, and 1*e* are shown positioned under heads 41*a*, 41*b*, 41*c*, 41*d* and 41*e*, respectively. In the embodiment described herein, cassette 1e will be denominated the master cassette, from which the other cassettes in drawer 21 are to be duplicated. Consequently, head 41*e* will be connected via its output leads 57*e* to a playback amplifier of conventional design. Each of the other cassettes must receive recording signals corresponding to the signals being played back from cassette 1*e*. Consequently, heads 41*a*, 41*b*, 41*c* and 41*d* must be connected via their input leads 57*a*, 57*b*, 57*c* and 57*d* to recording circuits of conventional design.

FIG. 7 is a diagrammatic illustration of the duplication process. As described in connection with FIG. 6, head 41*e* is arranged over master cassette 1*e*. Head 41*a* is arranged above unrecorded cassette 1*a*. Cassette 1a is to be duplicated from master cassette 1*e*. Head 41e senses the information magnetically recorded on the tape contained in cassette 1e and drives conventional playback circuit 70 through its leads 57*e*.

The output of playback circuit 70 drives conventional record circuit 71 over lines 72. The resulting output from record circuit 71 is conveyed to head 41*a* via leads 57*a*. Head 41*a* correspondingly generates an electrical field sufficient to record information on the tape contained in cassette 1a identical to the information read off the tape contained in master cassette 1*e*. The duplicating process for cassettes 1*b*, 1*c* and 1*d* is essentially the same as that described for cassette 1*a*. An electrical power source 73, of known design, provides the necessary electrical energy to circuits 70 and 71 over connections 74 and 75.

Figure 8:
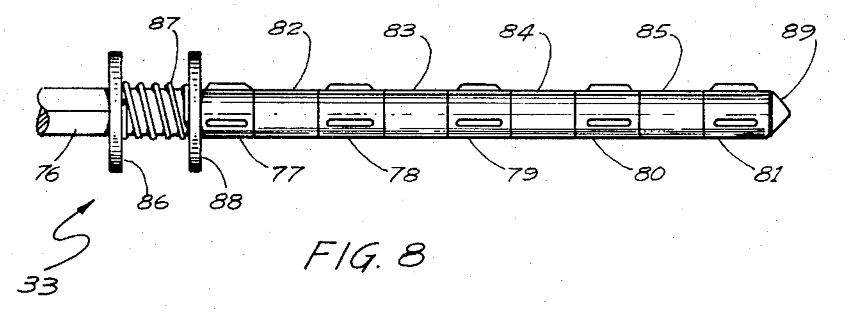
FIG. 8 is a detailed side view of take-up shaft 33 shown in FIGS. 2 and 3.

FIG. 8 is a detailed side view of take-up shaft 33. Shaft 33 consists of a polygonal (preferably hexagonal) drive shaft 76 which can be mounted on splined cassette drivers 77, 78, 80 and 81. The cassette drivers rotate on turned down sections of the polygonal (hexagonal) shaft 76. Between the splined cassette drivers are collars 82, 83, 84, and 85, the outer surfaces of which are turned down to slip freely through the cassette take-up splines and the inner surfaces of which are hexagonal to fit shaft 76. A keyed washer 86 backs a spring 87 which exerts a pressure on washer 88 and thus on all the members 77 through 85 which are held in place by cap 89. The splined cassette drivers 77, 78, 79, 80, and 81, which ride on the round sections of shaft 76, are driven by the frictional forces existing between them and collars 82, 83, 84, and 85, which are engaged on the hexagonal surfaces of shaft 76. The speed of splined shaft 33 is such as to insure take-up of the tape during the duplication process. The friction drive described herein, resulting from the pressure created by spring 87, is adjusted to insure proper packing of the tape in each cassette independently.

FIG. 9 is an end view of collars 82, 83, 84, and 85 described in connection with FIG. 8, showing hexagonal inner surfaces 90.

FIG. 10 is an end view of the splined cassette drivers 77, 78, 79, 80, and 81 shown situated on the turned down section of shaft 76.

Figure 11:
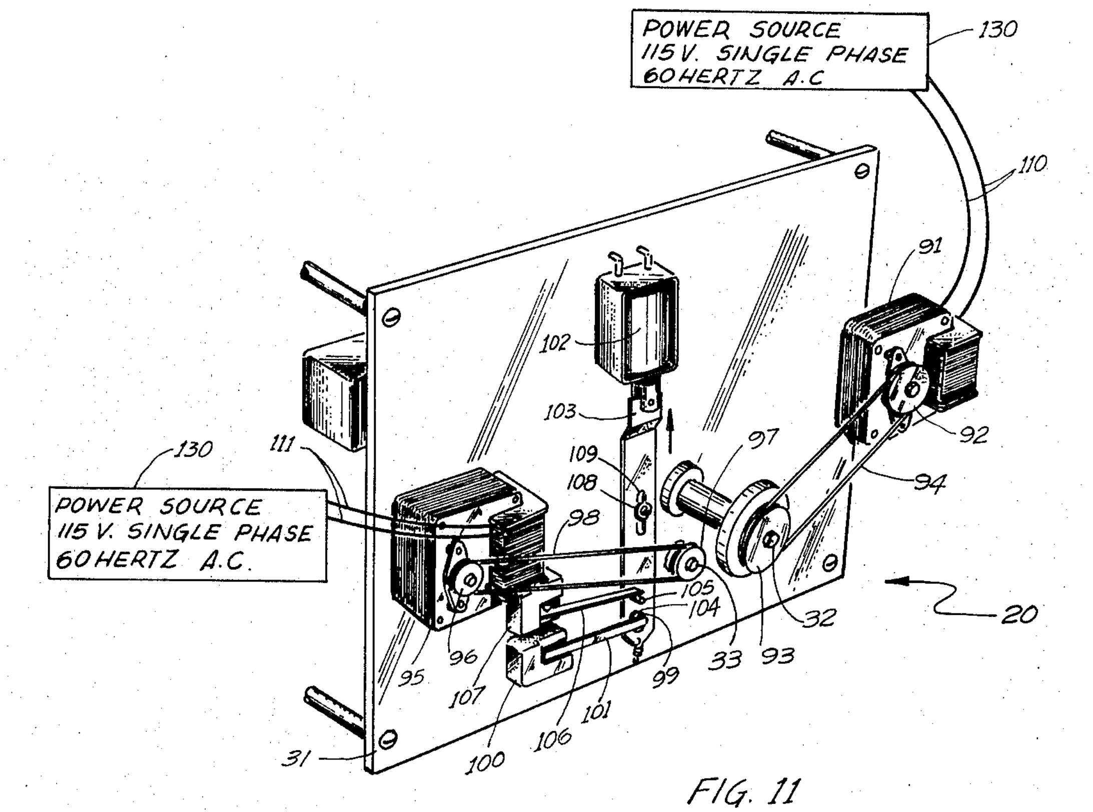
FIG. 11 is a rear perspective view of the duplicator.

FIG. 11 is a rear perspective view of the duplicator 20. Capstan drive motor 91 is securely attached to mounting plate 31. Pulley 92, which is mounted on capstan drive motor 91, drives pulley 93 by means of drive belt 94. Pulley 93 is mounted on capstan shaft 32. Similarly, take-up motor 95, having pulley 96, drives pulley 97 by means of drive belt 98. Pulley 97 is firmly attached to polygonal shaft 76 of take-up shaft 33. Since the capstan shaft 32 and the take-up shaft 33 are continuously running automatic controls are required to insure the actuation and release of solenoid 35 which controls the position of moving block assembly 39. To accomplish this, an extension pin 99, part of drawer 21 (FIG. 2), operates switch 100 by means of lever 101 when drawer 21 is closed. When switch 100 is actuated, latching solenoid 102 operates raising latch plate 103 which engages extension pin 99 in slot 104 located in the lower end of latch plate 103. When extension pin 99 is engaged in slot 104, extension pin 99 and consequently drawer 21 (FIG. 2) may not be withdrawn. Pin 105, situated as shown on latch plate 103, engages lever 106. Lever 106 is coupled as shown to switch 107. When latch plate 103 is raised by solenoid 102, pin 105 causes lever 106 to close switch 107. When switch 107 is closed, current is furnished to solenoid 35, thereby causing moving block assembly to be moved into close proximity to the cassettes placed in drawer 21 (FIG. 2). Thus, pinch rollers 40 and heads 41 (FIG. 2) do not engage the cassettes in drawer 21 (FIG. 2) until the drawer has been closed completely and latched. Switches 100 and 107, solenoid 102 and take-up motor 95 are securely attached to mounting plate 31. Latch plate 103, which is attached at its upper end to solenoid 102, is guided in its vertical movements by means of bolt 108, which is arranged in slot 109 of latch plate 103 and is threaded into mounting plate 31.

Drive motors 91 and 95 can be conventional, single phase induction motors powered by power source 130, the standard nominal A.C. line voltage of 115 volts, single phase, 60 hertz, connected to lines 110 and 111.

Figure 12:
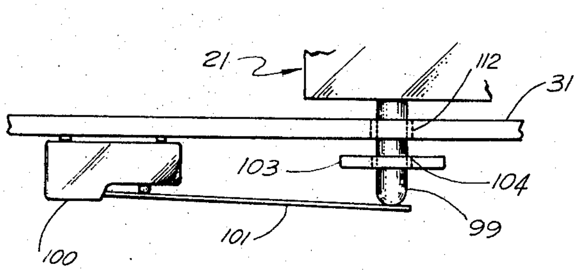
FIG. 12 is a top view of extension pin 99, shown in FIG. 11, with the drawer in the closed position.

FIG. 12 is a top view of extension pin 99 with drawer 21 in the closed position. Lever 101, which operates switch 100, is shown engaging extension pin 99. Extension pin 99, which passes through hole 112 in mounting plate 31, is shown positioned in slot 104 of latch plate 103.

Figure 13:
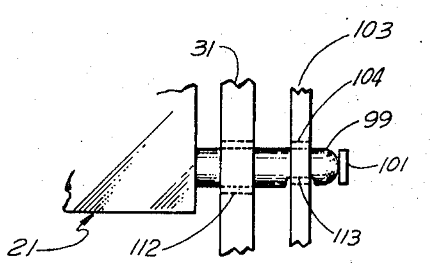
FIG. 13 is a side view of extension pin 99, shown in FIG. 11, with the drawer in the closed position.

FIG. 13 is a side view of extension pin 99 with drawer 21 in the closed position. Extension pin 99 passes through slot 104 in latch plate 103. When latch plate 103 is raised, the bottom edge of slot 104 engages notch 113 in extension pin 99, thereby preventing the withdrawal of extension pin 99.

Figure 14:
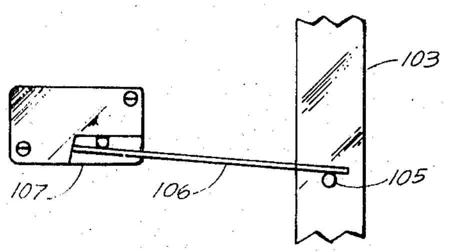
FIG. 14 is a front elevation of switch 107 of FIG. 11.

FIG. 14 is a front elevation of switch 107 showing the operation of lever 106 and pin 105. When latch plate 103 is raised, pin 105 engages lever 106 causing it to rise, thereby closing switch 107.

FIG. 15 is a side sectional view of the take-up shaft 33 as it passes through bushing 114 in mounting plate 31. Pulley 97 is positioned to the rear of mounting plate 31 and securely attached to shaft 76 of take-up shaft 33. Washers 86 and 88 and spring 87 are shown positioned on shaft 76 in front of mounting plate 31.

FIG. 16 is a side view of the capstan shaft 32 as it passes through bushing 115 in mounting plate 31. Pulley 93 is securely attached to the end of shaft 32 to the rear of mounting plate 31. Inertia wheel 116 is positioned on shaft 32 between pulley 93 and mounting plate 31.

FIG. 17 is an electrical circuit diagram showing the operation of the duplicator solenoids 35 and 102. Input voltage 28 V.D.C., obtained from a conventional unregulated rectifier circuit 133, is applied across the input terminals 117 and 118. When drawer 21 (FIG. 2) is closed, having previously been loaded with a master cassette and four unrecorded cassettes, extension pin 99 (FIG. 11) will close switch 100. To start the recording process, normally open record switch 119 is closed by a manual depression of the record pushbutton on the master control panel. Current will then flow through switch 119, coil 123 of relay 120 and normally closed switches 121 and 122. Relay 120 will operate closing contacts 124 and 125. Relay 120 will be maintained through contacts 124 even after record switch 119 is allowed to return to the normally open position. After relay 120 is operated, current will also flow through contact 125, solenoid 102, switch 100 which was closed by extension pin 99, and contacts 121 and 122. Solenoid 102 will operate causing latch plate 103 (FIG. 11) to rise actuating and closing switch 107. When switch 107 is closed, solenoid 35 will be energized causing pinch rollers 40 and heads 41 (FIG. 2) to engage the cassettes placed in drawer 21 (FIG. 2). Timer 126, of conventional design, will also be activated when switch 107 is closed. The output of timer 126 includes the normally closed contact 121. After a predetermined period, slightly in excess of the time required to complete the duplication process, timer 119 will cause contacts 121 to open. Relay 120 will thereupon be de-energized causing contacts 124 and 125 to open. When contact 125 opens, solenoids 35 and 102 will release causing moving block assembly 39 (FIG. 2) to move away from the cassettes placed in drawer 21 (FIG. 2) and latch plate 103 (FIG. 11) to fall thereby releasing extension pin 99 (FIG. 11). When extension pin 99 is released by latch plage 103, drawer 21 (FIG. 2) can be opened. If it is desired to stop the recording process prior to the time when timer 126 opens contacts 121, normally closed stop switch 122 can be opened by manually depressing the stop pushbutton on the master control panel, causing relay 120 to be de-energized with the results indicated above.

Obviously many modifications and variations of the invention set forth may be made without departing from the spirit and scope therefore only such limitations should be imposed as are indicated in the appended claims.

I claim:

1. A device for duplicating the recorded material of a tape cassette onto a plurality of recording cassettes, said cassettes including a take-up reel and a pay-off reel and a non-removable magnetic tape arranged for movement between said reels, said device comprising in combination: a plurality of recording heads, one for each recording cassette, a playback head for said pre-recorded cassette, a plurality of pinch rollers associated with said heads, a movable mounting assembly for said recording and playback heads and said pinch rollers, a single capstan shaft for driving the magnetic tapes of said cassettes, a take-up shaft for driving the take-up reels of said cassettes, power means for driving said capstan shaft and said take-up shaft, and loading means for aligning said plurality of recording cassettes and said pre-recorded cassette such that said single capstan shaft drives the taped source of signals and the cassettes being recorded, said loading means including a slidably arranged drawer containing mounting means for mounting said plurality of recording cassettes and said pre-recorded cassette, said mounting means being arranged so that said capstan shaft engages the tapes of said cassettes and the take-up shaft engages the take-up reels of said cassettes when the drawer is in a closed position, said mounting means also being so arranged that said capstan shaft and said take-up shaft are disengaged from said magnetic tapes and take-up reels when said drawer is in a fully open position and means for bringing said heads and said rollers into contact with said tape when said drawer is closed.

2. A device as in claim 1 wherein a single take-up shaft drives the take-up reels of said cassettes.

3. An improved device as in claim 1 wherein said take-up reels are separately friction driven from a common power source to provide an equal and pre-determined tape packing to each cassette.

4. A device as in claim 1 wherein said loading means includes a drawer latching mechanism which acts to prevent said drawer from being opened during the recording operation.

5. A device as in claim 1 which includes latch means operatively associated with said drawer to prevent said drawer from being opened during the duplicating operation; a first solenoid means arranged to operate said latch means when said drawer is completely closed; a second solenoid means to move said recording and playback heads into engagement with the tape in said cassettes; and means for releasing said latch means so that said drawer may be opened.

6. A device as in claim 5 wherein said second solenoid means is actuated by said first solenoid means.

* * * * *